(12) United States Patent
Dent et al.

(10) Patent No.: US 11,487,306 B2
(45) Date of Patent: Nov. 1, 2022

(54) TEMPERATURE CONTROL DEVICE AND SYSTEM

(71) Applicant: STEGO-HOLDING GMBH, Schwäbisch Hall (DE)

(72) Inventors: Robert Dent, Schwäbisch Hall (DE); Dietmar Guilliard, Mainhardt-Gailsbach (DE); Elmar Mangold, Zöbingen (DE)

(73) Assignee: STEGO-HOLDING GMBH, Schwäbisch Hall (DE)

( * ) Notice: Subject to any disclaimer, the term of this patent is extended or adjusted under 35 U.S.C. 154(b) by 413 days.

(21) Appl. No.: 16/593,443

(22) Filed: Oct. 4, 2019

(65) Prior Publication Data
US 2020/0117222 A1    Apr. 16, 2020

(30) Foreign Application Priority Data
Oct. 10, 2018    (DE) .......................... 102018124985.3

(51) Int. Cl.
*G05D 23/19* (2006.01)
*H01C 1/02* (2006.01)
(Continued)

(52) U.S. Cl.
CPC .............. *G05D 23/19* (2013.01); *H01C 1/02* (2013.01); *H05B 3/08* (2013.01); *H05B 1/0277* (2013.01)

(58) Field of Classification Search
CPC . G05D 23/19; H01C 1/02; H05B 3/08; H05B 3/34; H05B 3/267; H05B 3/02;
(Continued)

(56) References Cited

U.S. PATENT DOCUMENTS

| 3,976,854 | A |   | 8/1976 | Ishikawa et al. |
|---|---|---|---|---|
| 5,198,640 | A | * | 3/1993 | Yang ........................ H01C 1/02 |
|   |   |   |   | 219/505 |

(Continued)

FOREIGN PATENT DOCUMENTS

| CN | 106457345 A | * | 2/2017 | .......... B21D 26/039 |
|---|---|---|---|---|
| DE | 3042420 A1 |   | 6/1982 |   |

(Continued)

OTHER PUBLICATIONS

English machine-generated translation of German patent DE102015120183, May 24, 2017.
(Continued)

*Primary Examiner* — Shawntina T Fuqua
(74) *Attorney, Agent, or Firm* — Barnes & Thornburg LLP

(57) ABSTRACT

A temperature control device for arrangement on a surface to be tempered, having an upper part, a lower part, an electrical connection and at least one first tempering element in connection with the electrical connection. The lower part is designed for engagement with the upper part such that a surface pressure can be provided with the upper part and the lower part in the orthogonal direction to an upper side and a lower side of the first tempering element for surface coupling of the lower part to the surface to be tempered. The temperature control device can be fastened longitudinally displaceably to the surface to be tempered in such a way that a change in length of the temperature control device in the longitudinal direction of the temperature control device can be accommodated.

16 Claims, 4 Drawing Sheets

(51) Int. Cl.
*H05B 3/08* (2006.01)
*H05B 1/02* (2006.01)

(58) Field of Classification Search
CPC .......... H05B 1/0277; H05B 1/023; H05B 2203/016; H05K 7/20; H05K 7/20218; H02B 1/28; H02B 1/565
See application file for complete search history.

(56) References Cited

U.S. PATENT DOCUMENTS

| | | | |
|---|---|---|---|
| 2008/0067162 A1 | 3/2008 | Suzuki et al. | |
| 2017/0048931 A1* | 2/2017 | Ueno | H05B 3/0004 |
| 2017/0347473 A1* | 11/2017 | Freer | B01D 53/261 |

FOREIGN PATENT DOCUMENTS

| | | | | |
|---|---|---|---|---|
| DE | 202009004058 U1 | 6/2009 | | |
| DE | 102015120183 A1 | 5/2017 | | |
| EP | 0516112 A2 | 2/1992 | | |
| EP | 2224784 A1 * | 9/2010 | ........... | B60R 1/0602 |

OTHER PUBLICATIONS

English machine-generated translation of German patent DE3042420, Jun. 24, 1982.
EPO Search Report in EPO application EP19202241.6, dated Feb. 27, 2020.

\* cited by examiner

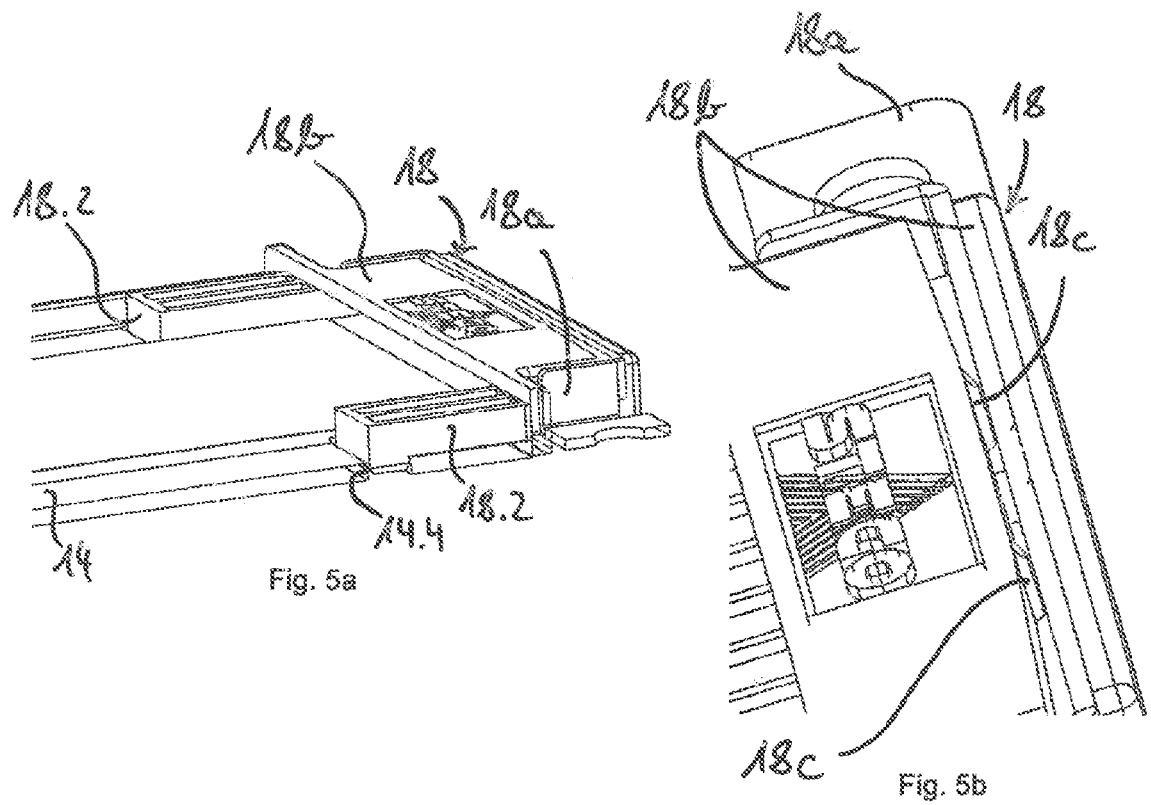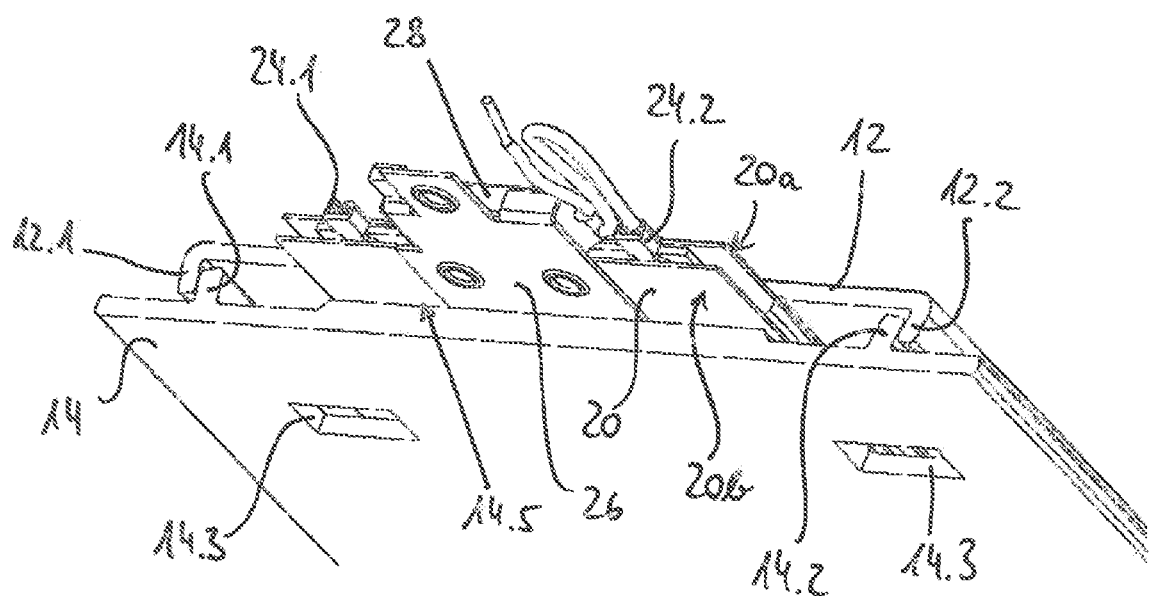

TEMPERATURE CONTROL DEVICE AND SYSTEM

CROSS REFERENCE TO RELATED APPLICATIONS

This application claims priority to German Patent Application No. 102018124985.3, filed Oct. 10, 2018. The disclosure set forth in the referenced application is herein incorporated by reference in its entirety.

FIELD OF THE DISCLOSURE

The invention relates to a temperature control device, in particular a resistance heating device, for arrangement on a surface to be tempered, having at least one upper part, at least one lower part and at least one first tempering element. Furthermore, the invention relates to a system, in particular a switch cabinet or an electronic housing, having such a temperature control device.

BACKGROUND

Control cabinets and electronic housings usually have to be tempered actively or passively. The active heating or cooling of such a housing ensures a minimum or maximum temperature of the electrical components. In this way it is possible, for example, to prevent the formation of condensation inside the housing or to avoid overheating of the components. If, on the other hand, the temperature in the switch cabinet or electronic housing falls below a minimum temperature, the formation of condensation can lead to short circuits in the electrical circuits.

Usually, the components are arranged as tightly as possible within a control cabinet or electronic housing in order to minimize the necessary installation space and to be able to provide a compact system unit. Modules or components for targeted temperature control of the entire system unit take up additional installation space and must be able to guarantee reliable and efficient temperature control at the same time.

Among other things, resistance heaters can be used to heat switch cabinets or the like. A heating resistor as a component of a resistance heating is in its simplest form a metal wire, also called a heating conductor. Usually a large wire length is required. Therefore, the wires are often laid in coils or in meander form. Such a helical or meander-shaped arrangement of the heating conductor, however, requires an extensive installation space for the heating component alone within the switch cabinet or electronic housing.

In addition, there is the problem that efficient heat transfer can only be provided with sufficient surface contact. A temperature increase, however, leads to a linear expansion of a heating device or individual components and thus to bulging. The necessary surface contact for suitable heat transfer becomes impossible in this case. Such bulging can occur as a permanent deformation, reducing heat transfer and not fully ensuring the function of the heater.

SUMMARY

The invention is thus based on the object of providing an improved temperature control device, in particular for switch cabinets and electronic housings, which has a simple, integral design, ensures efficient heat transfer, enables cost-effective manufacture, provides simplified maintenance and servicing and takes up minimal installation space.

This object is solved by a temperature control device and a system as disclosed herein. Preferred embodiments are disclosed.

According to the present invention, a temperature control device, in particular a resistance heating device, is provided for arrangement on a surface to be tempered, having at least one upper part, at least one lower part and at least one first tempering element, in particular a heating element. The upper part is arranged opposite an upper side of the first tempering element. The lower part is arranged opposite an underside of the first tempering element. The lower part is designed for engagement with the upper part in such a way that a surface pressure, in particular a continuous surface pressure in orthogonal direction to the upper side and the underside of the first tempering element, can be provided with the upper part and the lower part for surface coupling of the lower part to the surface to be tempered. In addition, the temperature control device can be attached longitudinally displaceably to the surface to be tempered in such a way that a change in length of the temperature control device in the longitudinal direction of the temperature control device can be accommodated.

The invention is based on the basic idea that the temperature control device provides a mechanical pretension to ensure that the tempering element or heating element and the temperature control device are coupled to a substrate or to a surface to be tempered, such as the surface or wall surface of a switch cabinet or an electronic housing, even in the event of linear expansion. In this way, an efficient temperature transition to an external coupling surface or substrate surface in contact with the lower part can be achieved.

Furthermore, it should be possible to provide a space-saving design by means of the temperature control device in accordance with the invention. In particular, the upper part and the lower part, as well as further components of the temperature control device, should be integrally connected or connectable to one another in such a way that the installation space of the temperature control device can be reduced or minimized.

For the purposes of this invention, a temperature control device is in particular a heating device. It is preferably provided to design the temperature control device as an electrical heating device, for example as an electrical resistance heating device. Alternatively, it is conceivable to equip the temperature control device with a tempering element which has a fluid circuit and is supplied with a fluid in order to achieve a heating effect or a cooling effect.

According to the invention, the upper part of the upper side of the first tempering element is arranged or directed opposite, especially along a coupling surface of the upper part. The lower part is arranged or directed opposite to the underside of the first tempering element, in particular along a coupling surface of the lower part. This means that the tempering element is mounted flat between the upper part and the lower part of the temperature control device and can be clamped. In particular, coupling and temperature transfer can take place over at least a substantial part of the base area of the at least one first tempering element.

It is provided that the lower part is designed for engagement with the upper part in such a way that a surface pressure, preferably a continuous or uniform surface pressure, in orthogonal direction to the upper side and the underside of the first tempering element can be provided with the upper part and the lower part for surface coupling of the lower part to the surface to be tempered. Thus, a two-sided or double-sided surface tensioning of the first tempering element is provided, as soon as the lower part is purposefully coupled to the surface to be tempered. The upper part and the lower part can be flexibly or reversibly deformable for practical interlocking.

In the sense of this invention, a surface pressure or surface tension is understood to mean that opposing surfaces are coupled to each other in order to minimize air or media gaps and to optimize a temperature transition. Also in the course of a temperature increase and a related linear expansion of the upper part, the first tempering element and/or the lower part, an optimal coupling of the opposing surfaces is available. The efficiency of the heat transfer to a surface on which the base is positioned is optimized.

In addition, it is provided that the temperature control device can be attached longitudinally displaceably to the surface to be tempered in such a way that a change in length of the temperature control device in the longitudinal direction of the temperature control device can be accommodated. In particular, the temperature control device may have a mounting mechanism for mounting the temperature control device on the surface to be tempered which allows a change in length in the longitudinal direction of the temperature control device without exerting a deforming force on the temperature control device.

In the sense of the invention, a longitudinally displaceable fastening of the temperature control device means in particular that a change in length of the temperature control device can be accommodated or compensated. In this way, an appropriate coupling of the temperature control device, especially the lower part, to the surface to be tempered or to the substrate can be ensured during operation of the temperature control device, and thus also in the case of longitudinal expansion of the temperature control device due to temperature influences.

According to a preferred embodiment, the upper part has at least one first clamping element which extends in the longitudinal direction of the upper part, so that the upper part provides a pretension when meshing with the lower part, in particular over the entire extension of the lower part.

The at least one first clamping element may extend on an inner side of the upper part. Preferably, the first and second clamping elements may be symmetrically formed on an inner side of the upper part and extend in the longitudinal direction of the upper part.

The at least one first clamping element can preferably be designed as a material cut-out or as a material weakening along the upper part, in particular as a material weakening which can be specifically adjusted or formed. A stiffness or flexibility of the upper part can be modified based on the design and position of the at least one first clamping element. The pretension or pretensioning force, which in the assembled state of the temperature control device is exerted in particular by the upper part on the lower part, can be adjusted by means of at least one first tensioning element.

In this sense, the pretensioning force of the upper part, which is fundamentally present on the basis of the design of the upper part, can be reduced by means of the at least one first tensioning element in such a way that, in the condition for use, i.e. in particular in the region of a planned operating temperature, a surface coupling and heat transfer surface of the temperature control device can be provided along the lower part.

The upper part in particular can be designed in the sense of a spring element or a compression spring to exert a continuous compressive force or surface pressure on the tempering element and the lower part. In this way, the bulging or lifting of the tempering element and/or the lower part in the course of a temperature increase can be counteracted and a surface contact for heat transfer can be ensured.

Based on the design of the clamping element in the longitudinal direction of the upper part, the temperature control device can have any total length. A pretension and coupling for heat transfer over the entire length of the upper and lower part is achieved.

In addition, the lower part can have at least one specifically designed material cut-out in order to minimize deformation in the event of an increase in temperature.

According to a preferred embodiment, the upper part has a surface structure, in particular a ribbed surface structure. Thus an enlargement of the effective surfaces for heat exchange or temperature control can be provided. In the sense of the present invention, the upper part may have any surface structure along an exterior side.

Preferably, the upper part and/or the lower part can be designed or provided as an extruded profile or extrusion profile. A simple and cost-effective production of the upper part and/or the lower part is available.

According to a further embodiment, the temperature control device has an earth contact element which can be connected to the underside of the first tempering element so that a coupling, in particular an electrical-thermal coupling, to the first tempering element and the lower part can be provided.

By providing a two-dimensional electrical connection to the tempering element, the earth contact element can guarantee a safe electrical grounding or earth connection. In particular, a power cable or connecting cable can be connected to the earth contact element.

According to one embodiment it is intended that the temperature control device has a temperature sensor or a temperature monitor which is connected to the earth contact element as a heat conducting element.

In this sense, the earth contact element serves as a current and heat conducting element. The earth contact element thus has a combined, at least twofold functionality for the temperature control device in accordance with the invention. By means of the preferably electrical-thermal coupling of the earth contact element to the first tempering element and the lower part, both an electrical earthing and an appropriate temperature measurement along the earth contact element can be made possible. An advantageous, efficient arrangement of the temperature sensor is possible.

In a preferred embodiment it is provided that at side ends of the upper part and in side end regions of the lower part mutually corresponding first and second interlocking elements are provided which extend in the longitudinal direction of the upper part and in the longitudinal direction of the lower part, so that the upper part and the lower part can be connected or interlocked to one another in a force-locking and/or positive-locking manner, in particular over their entire longitudinal extension. Alternatively, the interlocking elements may only be formed over part of the longitudinal extension of the upper part and/or lower part. Within the terms of the invention, the upper part and the lower part have corresponding first and second interlocking elements.

Preferably, the upper part and/or the lower part are reversibly deformable or elastically designed so that the upper part and the lower part can be connected and detached from each other by temporary deformation. In particular, on the basis of the first and second interlocking elements in combination with the first clamping element, a pretension of the temperature control device can be provided for purposefully coupling the internal tempering element and the lower part to an external substrate surface or the surface to be tempered, such as a surface of a switch cabinet or the like.

Preferably the upper part and the lower part can be detachably connected to one another in one spatial direction. Thus, the upper and lower parts can be moved relative to each other in their respective longitudinal directions in order to make or break a connection. In addition, the first and/or the second interlocking elements can be connected to one another by at least a sectional rotational movement.

According to one embodiment, the temperature control device has a first end cap element and a second end cap element, the upper part, with the first end cap element and the second end cap element each being arranged on the lower part, in particular being fastened thereto.

The lower part represents a central component of the temperature control device. The upper part, the first end cap element and/or the second end cap element can be designed as a central component for engagement in the lower part. An integral design of the temperature control device is available.

The end cap elements can be placed on the lower part before the upper part is attached. This provides protection against possible contact with voltage- or current-carrying components when assembling the temperature control device. In addition, the lateral arrangement of the end cap elements on the lower part allows the temperature control device to be designed to be any length or size by means of the upper and lower parts.

In addition, current- or voltage-carrying elements, such as an earth contact element and/or a temperature sensor, can also be accommodated by the lower part of the temperature control device.

According to another preferred embodiment, the upper part and the lower part are arranged between the first and second end cap element to form a housing for the first tempering element.

The arrangement of the upper part, the lower part, the first end cap element and the second end cap element in this sense provides a substantially closed cavity for receiving and purposefully coupling the tempering element and the heating element respectively. The temperature control device can essentially be modularly assembled or constructed.

According to one embodiment, the first end cap element has at least one first latching element, wherein the second end cap element has at least one second latching element and the lower part has at least one first receiving element and at least one second receiving element, wherein the first and second latching elements are each designed corresponding to the first and second receiving element, for the force-locking and/or positive-locking connection of the lower part to the first and second end cap element.

In particular, the first or second latching element can be designed as a latching hook, latching lug or the like for engagement in the first or second receiving element on the lower part. In addition, the first latching element in combination with the first receiving element and the second latching element in combination with the second receiving element can be designed differently.

In accordance with a preferred embodiment, it is provided that the second end cap element has a base body and a fastening clip for fixing the base body to the surface to be tempered, wherein the fastening clip is arranged in a recess in the base body in such a way that a change in length of the temperature control device, in particular of the upper part and/or the lower part, can be compensated by means of elastic deformation of the fastening clip.

The recess in the base body can be formed larger than the fastening clip or a thickness of the fastening clip. Furthermore, in an initial state of the temperature control device, i.e. before the temperature control device is used, the fastening clip can be arranged centrally or at one end of the recess in the base body so that a longitudinal extension of the temperature control device can be received or absorbed in the operating state, in particular in the form of plastic deformation of the fastening clip. In the operating state, a flat support surface of the temperature control device can thus be ensured.

According to a further embodiment, at least one nose element is formed along the recess of the base body for transmitting a clamping force between the base body and the fastening clip in the longitudinal direction of the temperature control device. In particular, two nose elements can be arranged symmetrically distributed along the recess of the base body.

In the event of a change in length of the temperature control device, in particular if the temperature control device is extended, the resulting tension force can be transferred from the nose elements to the fastening clip by means of the nose element and converted into an elastic deformation of the fastening clip. In this way, the fastening clip can absorb or compensate for the change in length of the temperature control device, in particular of the upper part and/or the lower part.

In a secondary aspect of the invention, a system is provided, in particular a switch cabinet or an electronic housing, with a temperature control device as disclosed herein.

In this sense, the system can be, for example, a switch cabinet with electrical or electronic components, which has the temperature control device according to the invention, preferably to ensure a minimum temperature or minimal temperature in the switch cabinet. In this way, the formation of condensation inside the control cabinet can be avoided and the functionality of the components of the control cabinet can be ensured. An advantageous, targeted temperature control can be provided.

In the following, the invention is explained in more detail with reference to the attached drawings with regard to further features and advantages, wherein:

BRIEF DESCRIPTION OF THE FIGURES

FIG. 5a shows a detailed perspective representation of the first embodiment example according to FIG. 1;

FIG. 5b shows a further detailed perspective representation of the first embodiment example according to FIG. 1;

FIG. 6 shows a further detailed perspective view of the first embodiment example according to FIG. 1;

DETAILED DESCRIPTION

Figure 1:
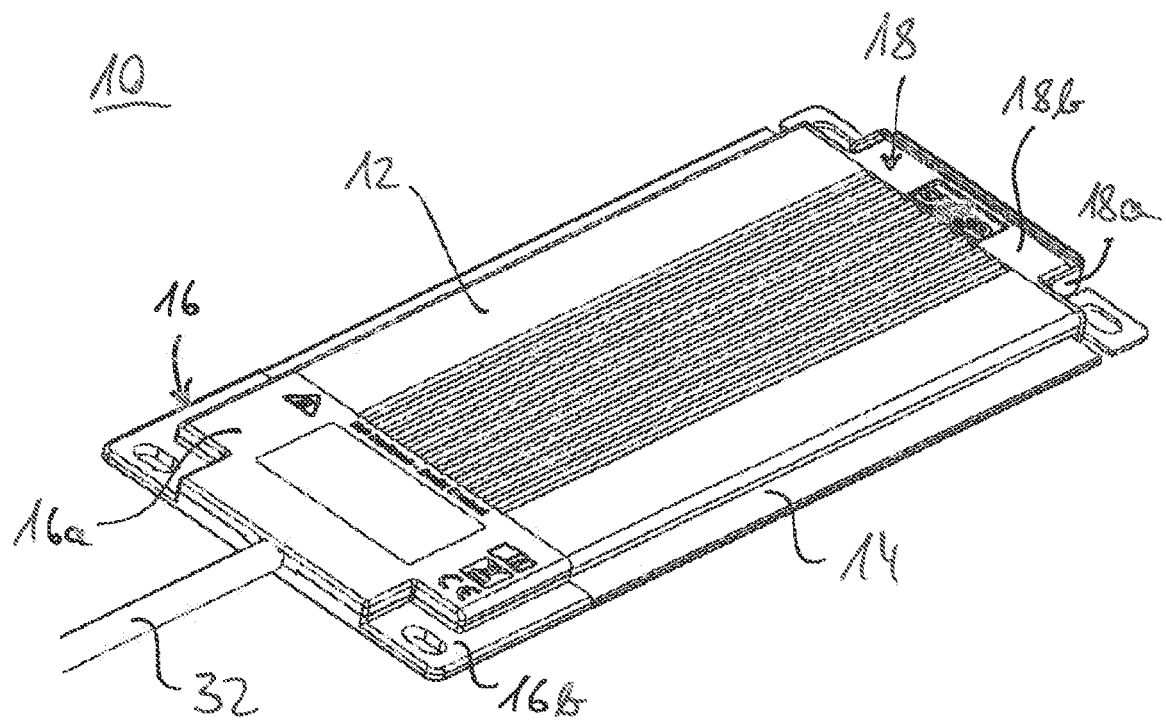
FIG. 1 shows a perspective view of a first embodiment example of a temperature control device according to the invention.

FIG. 1 shows a perspective view of a first embodiment example of a temperature control device 10 according to the invention.

The temperature control device 10 is shown with an upper part 12 and a lower part 14 arranged on top of each other. A first end cap element 16 and a second end cap element 18 are arranged opposite each other at the longitudinal ends of the upper part 12 and lower part 14 respectively. The upper part 12, the lower part 14, the first end cap element 16 and the second end cap element 18 form an essentially closed housing.

The first end cap element 16 has an upper part 16a and a lower part 16b, which are placed on top of each other and connected to each other. In the first end cap element 16, further components of the temperature control device 10, such as an earth contact element 26 or a temperature sensor 28, can be arranged. The second end cap element 18 is also multi-part according to FIG. 1, in particular with an additional, insertable fastening clip 18a and a base body 18b. Alternatively, the second end cap element 18 can be designed in one piece.

In addition, an electrical cable or connecting cable 32 runs into the first end cap element 16 in the longitudinal direction of the temperature control device 10. Thus the temperature control device 10 can be supplied with electric current, for example when the temperature control device 10 is designed as an electric resistance heater according to the invention. The first end cap element 16 and/or other components of the temperature control device 10 can also be designed in such a way that a strain relief can be provided for the connecting cable 32.

In addition, the first and second end cap elements 16; 18 are each provided with two fixing holes for fixing the temperature control device 10, e.g. inside a switch cabinet or an electronic housing. The fixing holes can be formed in the fixing clip 18a of the second end cap element 18. The fixing holes can be designed as longitudinal grooves in one corner of the temperature control device 10 as shown in FIG. 1.

Preferably, the fixing holes can be formed on at least one of the end cap elements 16; 18 transversely to the longitudinal extension of the temperature control device 10 and can be formed on the opposite end cap element 16; 18 in the longitudinal direction of the temperature control device 10, in particular in the case of an integral configuration of the first and/or second end cap element 16; 18. Thus the temperature control device 10 can be fastened in a longitudinally displaceable manner so that a change in length can be absorbed or compensated.

Figure 2:
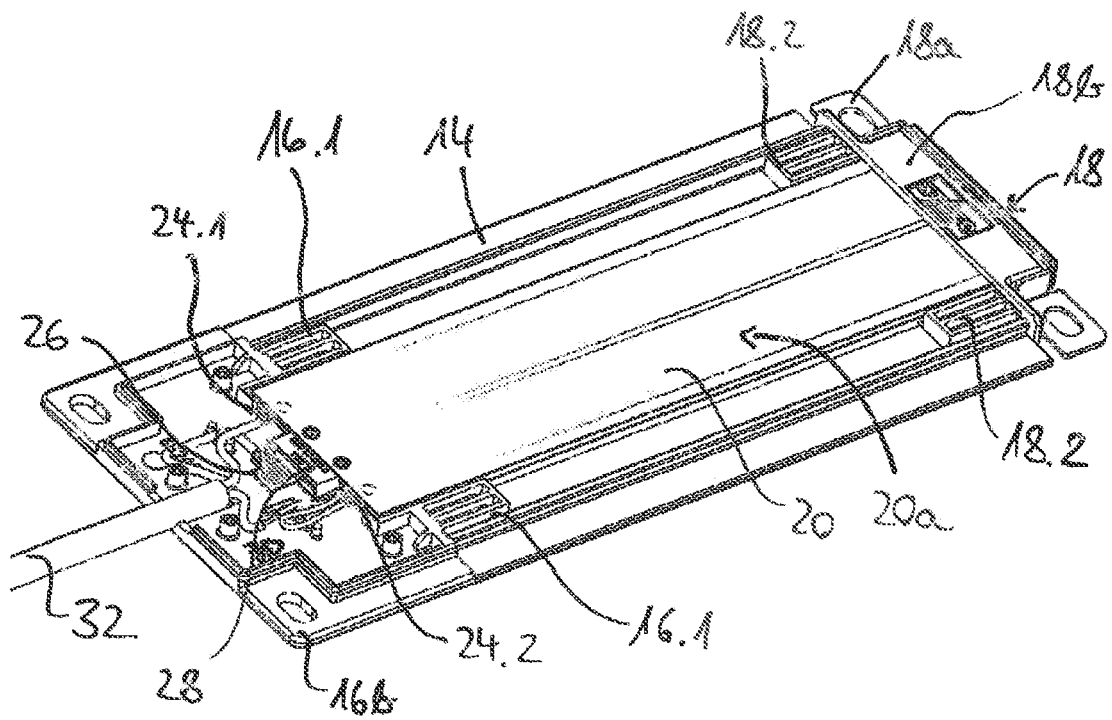
FIG. 2 shows an interior perspective representation of the first embodiment example of a temperature control device according to the invention according to FIG. 1.

FIG. 2 shows a perspective interior representation of the first embodiment example of a temperature control device 10 according to the invention according to FIG. 1.

According to FIG. 2, the temperature control device 10 has a first tempering element 20 with an upper side 20a. The first tempering element 20 protrudes from the first end cap element 16, over the upper part 12 or lower part 14, up into the second end cap element 18.

The connecting cable 32 is arranged on the lower part 16b of the first end cap element 16 for the electrical supply or connection, in particular, of the first tempering element 20. Furthermore, a first electrical connection 24.1 and a second electrical connection 24.2 are provided on the first tempering element 20 for the electrical connection with the connecting cable 32. In addition, an earth contact element 26 is arranged on the first tempering element 20, which is connected to the cable or connecting cable 32.

The lower part 16b of the first end cap element 16 has two first latching elements 16.1. The first two latching elements 16.1 extend laterally of the first tempering element 20 from the lower part 16b of the first end cap element 16 into the lower part 14 to connect the first end cap element 16 to the lower part 14. Furthermore, the second end cap element 18 has two second latching elements 18.2, which extend into the lower part 14 on both sides of the first tempering element 20, for connecting the second end cap element 18 to the lower part 14. According to FIG. 2, the first and second latching elements 16.1; 18.2 are of identical design.

Figure 3:
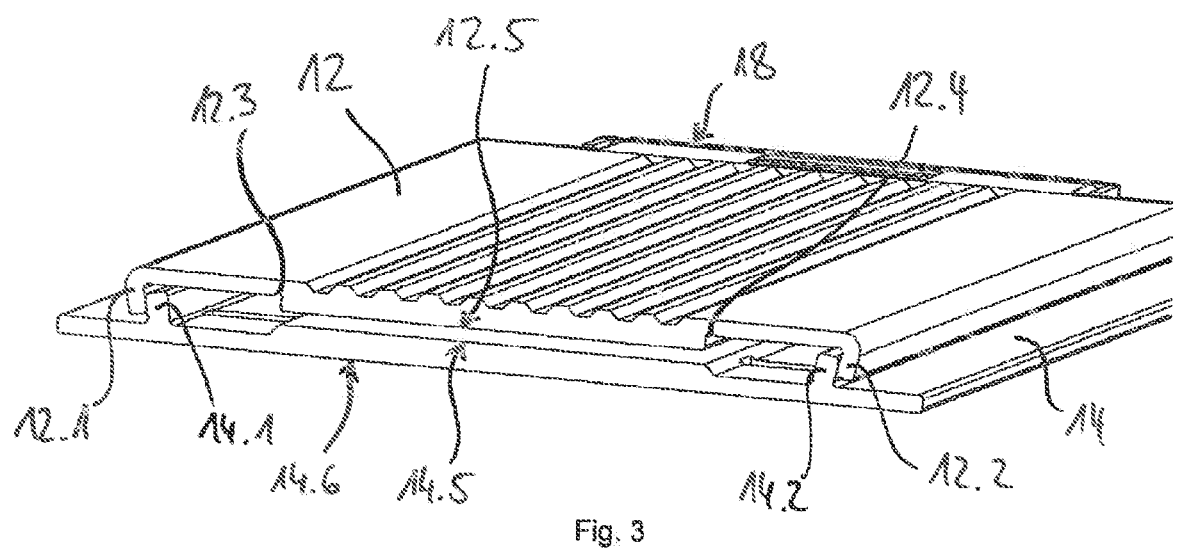
FIG. 3 shows a perspective sectional view of the first embodiment example according to FIG. 1.

FIG. 3 shows a perspective sectional view of the first embodiment example according to FIG. 1.

The upper part 12 has a coupling surface 12.5 and the lower part 14 has an opposite coupling surface 14.5 for coupling the first tempering element 20. The at least one first tempering element or heating element 20 (not shown in FIG. 3) can be appropriately braced between the coupling surfaces 12.5; 14.5. The coupling surfaces 12.5; 14.5 allow an even, continuous surface pressure or surface tension over a substantial part of the upper and lower surface 20a; 20b of the first tempering element 20.

The upper part 12 of the temperature control device is connected to the lower part 14 in a force-locking and/or positive-locking manner. A first and a second interlocking element 12.1; 12.2 are formed at side ends of the upper part 12, wherein first and second interlocking elements 14.1; 14.2 corresponding thereto are provided at side end regions of the lower part 14. The first interlocking elements 12.1; 14.1 and the second interlocking elements 12.2; 14.2 are each designed to engage one another over the entire length of the upper and lower parts 12; 14. A connection in the sense of a snap effect is provided.

According to FIG. 3, the first and second interlocking elements 12.1; 12.2 of the upper part 12 are identical to each other, in particular as inwardly angled side ends with an angle of approx. 100 degrees to the horizontal. Likewise, the corresponding first and second interlocking elements 14.1; 14.2 of the lower part 14 are identically formed, in particular as nose-shaped wall portions, which are inclined towards the side ends of the lower part 14 at an angle of approximately 100-110 degrees with respect to the horizontal. The alignment with respect to the vertical or horizontal is related to the illustration in FIG. 3 and in practical use depends on the concrete alignment of the temperature control device 10.

Preferably, the interlocking elements 12.1; 12.2; 14.1; 14.2 of the upper part 12 and the lower part 14 are designed in such a way that pretensioning of the temperature control device 10 is possible. The upper part 12 and/or the lower part 14 can be at least partially reversibly deformable.

Furthermore, the upper part has a first and a second clamping element 12.3; 12.4 in the form of clamping grooves 12.3; 12.4. The clamping grooves 12.3; 12.4 are designed on the side of the coupling surface 12.5 of the upper part 12 as targeted material recesses or material weaknesses. In particular, the clamping elements or clamping grooves 12.3; 12.4 are designed symmetrically in the form of a circular section over approx. 270 degrees and extend in the longitudinal direction of the upper part 12.

By means of the first and second clamping grooves 12.3; 12.4 it is possible, when the upper part 12 is connected to the lower part 14, to generate a specific clamping force which mechanically pretensions the temperature control device 10.

Thus, a continuous surface pressure can be exerted on the first tempering element or heating element 20 along the coupling surfaces 12.5; 14.5.

In addition, the temperature control device 10 can be pretensioned in such a way that any linear expansion is compensated in the event of a temperature increase and a lower surface 14.6 of the lower part 14 is always coupled to the substrate.

In addition, a surface structure is formed over at least part of an outer surface of the upper part 12. In particular, the structure is provided in the form of webs with set flanks, wherein the webs extend in the longitudinal direction of the upper part 12. Thus, the effective surface area for heat transfer can be increased appropriately.

Figure 4:
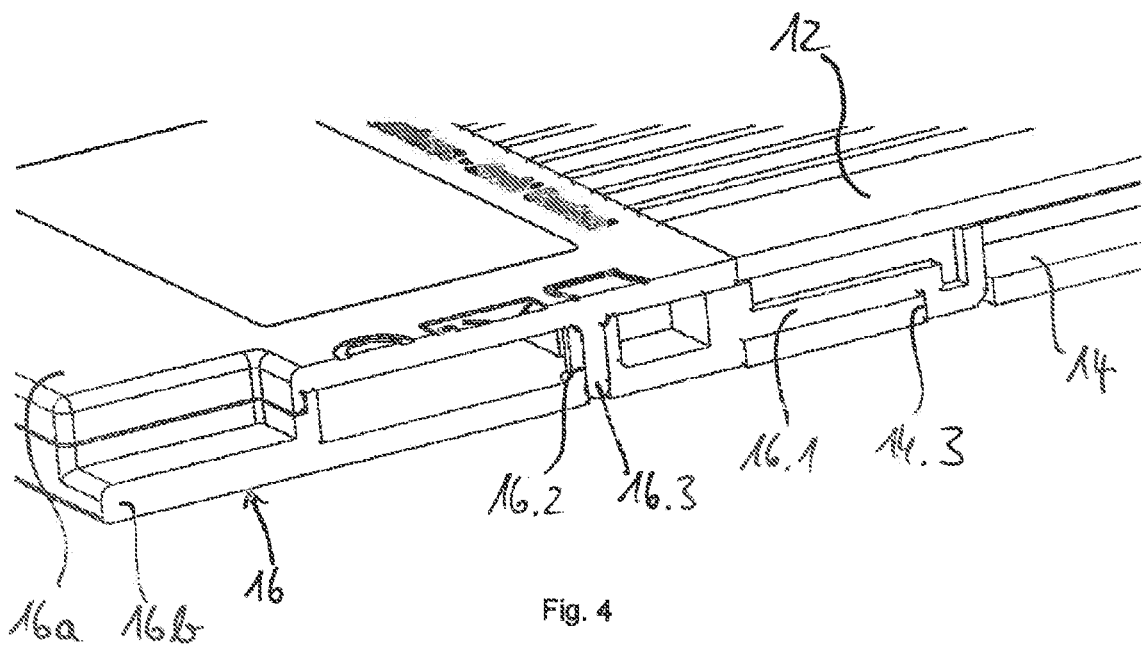
FIG. 4 shows a perspective sectional view of the first embodiment example according to FIG. 1.

FIG. 4 shows a perspective sectional view of the first embodiment example according to FIG. 1.

The upper part 16a of the first end cap element 16 has at least one pin element 16.3. The pin element 16.3 can be provided with a round or a polygonal cross-section. The lower part 16 is designed with at least one corresponding receiving opening 16.2. In particular, the receiving openings 16.2 may have a polygonal, preferably hexagonal, cross-section. In this way the pin element 16.3 can engage in the receptacle openings 16.2 and an appropriate pressing can take place to connect the upper part 16a to the lower part 16b of the first end cap element 16 in a force-locking and/or positive-locking manner.

Furthermore, the upper part 16a and the lower part 16b are flush with the upper part 12 and the lower part 14.

Furthermore one of the two first latching elements 16.1 of the first end cap element 16 is shown in detail in FIG. 4. The first latching element 16.1 is intended to engage into a corresponding first receiving element 14.3 of the lower part, in particular in the form of a latching hook. The first latching elements 16.1 are designed in one piece with the lower part 16b of the first end cap element 16.

Preferably, a first receiving element 14.3 of the lower part 14, as well as the second receiving element 14.4, can be designed in the form of a rectangular recess by a subsequent process step on the lower part 14. In this way, the lower part 14, like the upper part 12, can be provided in its basic form as an extruded profile or an extrusion profile.

FIG. 5a shows a detailed perspective representation of the first embodiment example according to FIG. 1.

According to FIG. 5a the second end cap element 18 has second latching elements 18.2. The second latching elements 18.2 are identical to the first latching elements 16.1 of the first end cap element 16 and engage in second receiving elements 14.4 of the lower part.

In addition, the second end cap element 18 can be designed in several parts according to FIG. 5a, in particular with an insertable or clampable fastening clip 18a and a base body 18b. Fixing holes are provided in the fastening clip 18a for fixing the temperature control device 10 to an external surface.

The base body 18b of the second end cap element 18 has a recess in which the fastening clip 18a is arranged or accommodated. The recess or cut-out of the base body 18b in the longitudinal direction of the temperature control device 10 is larger than the fastening clip 18a or a thickness of the fastening clip 18a.

Thus, a longitudinal expansion of the temperature control device 10, in particular of the upper part 12 or the lower part 18, can be compensated along the recess of the base body 18b, while the fastening clip 18a ensures the fixation of the temperature control device 10 to the external surface or a surface to be tempered. In conjunction with the recess in the base body 18b, the fastening clip 18a represents a compensating component for a linear expansion of the temperature control device 10, in particular of the upper part 12 or the lower part 14.

FIG. 5b shows a further detailed perspective representation of the first embodiment example according to FIG. 1.

In particular, FIG. 5b shows the arrangement of the fastening clip 18a in the recess of the end cap element 18. Along the recess of the end cap element 18 or the base body 18b there are two nose elements 18c which extend in the direction of the fastening clip 18a.

In particular, the nose elements 18c can be used to transmit force from the base body 18b to the fastening clip 18a. In the course of a longitudinal expansion or a change in length of the temperature control device 10, in particular of the upper part 12 and/or the lower part 14, the nose elements 18c transmit a force to the fastening clip 18a so that deformation of the fastening clip 18a occurs. In this way, the change in length of the temperature control device 10 can be accommodated or compensated.

Furthermore, the nose elements 18c are semi-circular according to FIG. 1 and arranged symmetrically to a longitudinal axis of the temperature control device 10 along the recess of the base body 18b.

FIG. 6 shows another detailed perspective view of the first embodiment example according to FIG. 1.

The earth contact element 26 is coupled to the underside 20b of the first tempering element 20 according to FIG. 6. The earth contact element 26 protrudes as a plate below the first tempering element 20 and has a connection lug for connection to the connecting cable 32. In addition, the temperature sensor or temperature monitor 28 is arranged on the earth contact element 26. Thus the earth contact element 26 also serves as a heat conductor element for the temperature sensor 28 and in this sense has a combined functionality.

The first tempering element 20 can be constructed in several layers. Furthermore, in the sense of the invention, several tempering elements 20 can be stacked on top of each other and/or arranged next to each other.

Furthermore, FIG. 6 shows the coupling surface 14.5 of the lower part for the clamped, surface coupling of the underside 20b of the first tempering element 20 in order to provide an optimized heat transfer.

Figure 7:
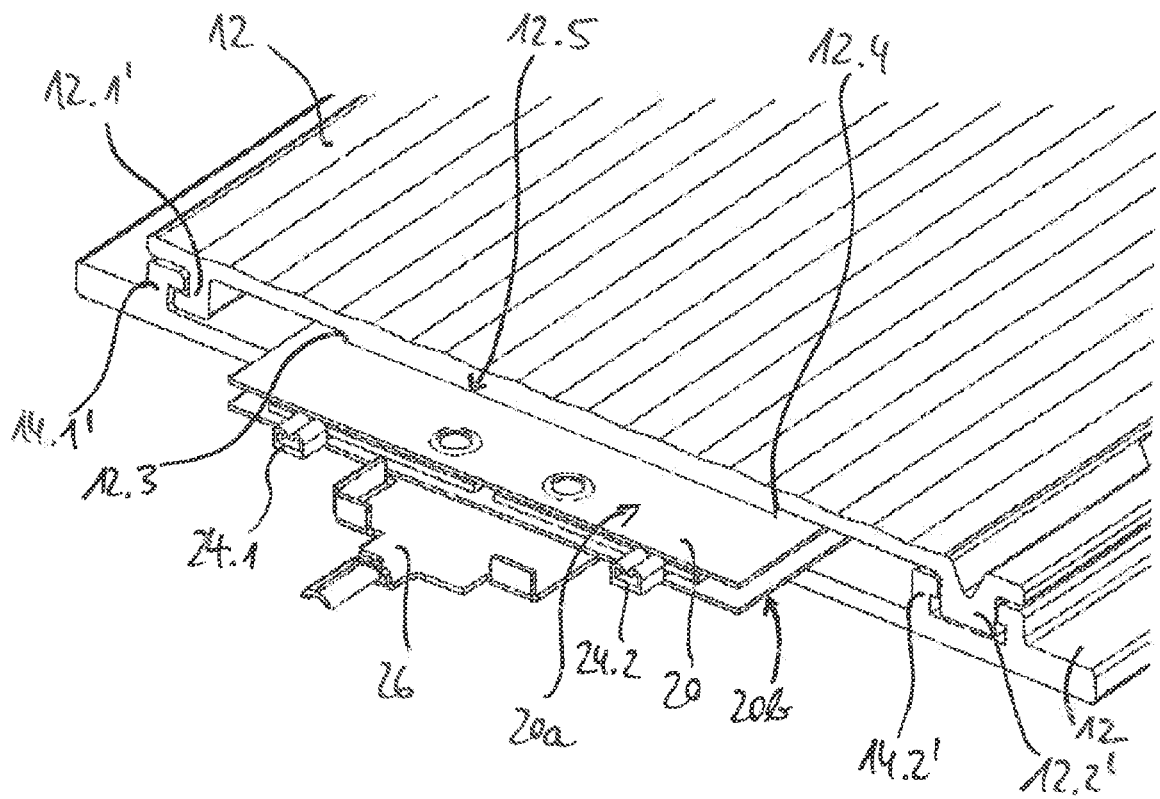
FIG. 7 shows a perspective view of a second embodiment example of the temperature control device according to the invention.

FIG. 7 shows a perspective view of a second embodiment example of the temperature control device 10 according to the invention.

The upper part 12 and the lower part 14 each have mutually corresponding first interlocking elements 12.1'; 14.1' and second interlocking elements 12.2'; 14.2'. According to FIG. 7, the first interlocking elements 12.1'; 14.1' are formed in an L-shaped manner in such a way that mutual engagement is possible. In particular, the first interlocking elements 12.1'; 14.1' can be brought into engagement with each other in the sense of a partially rotational movement or a purely translational displacement, transversely to the longitudinal extension of the upper part 12 and lower part 14.

The second interlocking element 14.2' of the lower part 14 is essentially designed as a U-shaped groove. The second interlocking element 12.2' of the upper part 12 can be inserted with a rectangular cross-section into the second interlocking element 14.2' of the lower part 14 and clamped there. A reversible deformation for clamping the second interlocking elements 12.2'; 14.2' can be provided by means of a V-shaped groove of the upper part 12 on an upper side of the second interlocking element 12.2'.

In addition, it can be seen from FIG. 7 that the upper part 12 comes into contact with the upper side 20a of the first tempering element 20 along the coupling surface 12.5 in order to apply a surface pressure to a substantial part of the upper side 20a of the first tempering element 20. The same applies to the coupling surface 14.5 of the lower part 14 in contact with the underside 20b of the tempering element 20.

Furthermore, the upper part 12 has a surface structure along the outer side over almost the entire width in the form of alternately rising and falling flanks, which adjoin each other in wide-angled edges.

Figure 8:
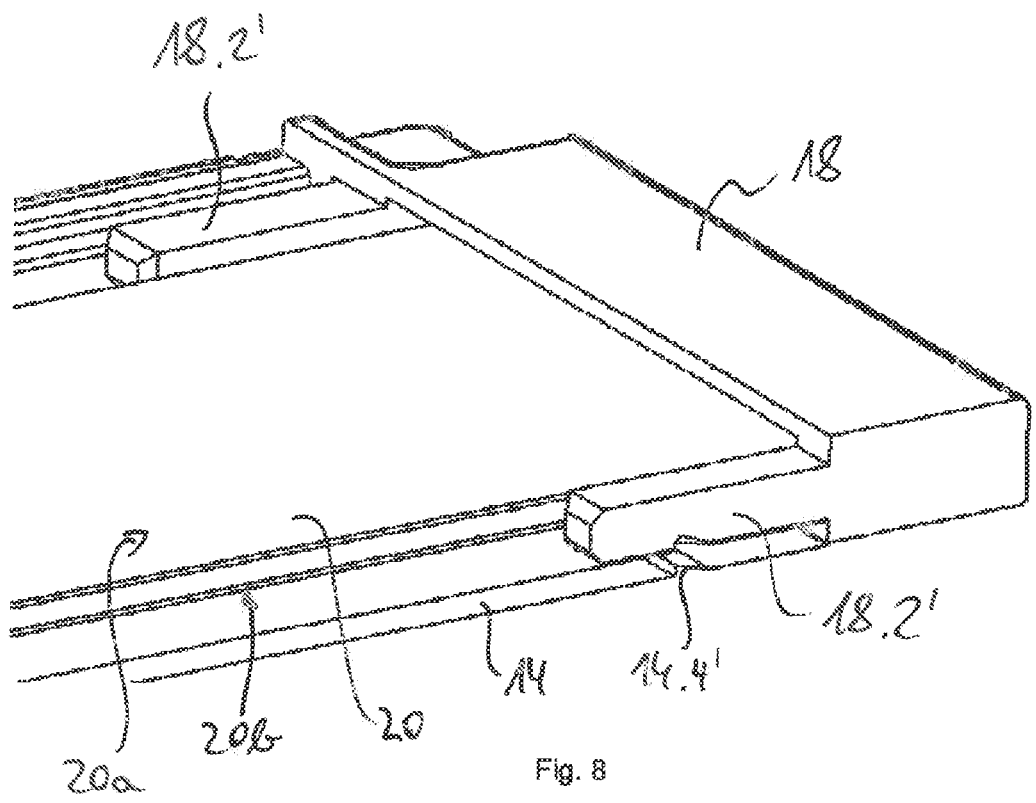
FIG. 8 shows a perspective sectional view of the second embodiment example according to FIG. 7.

FIG. 8 shows a perspective sectional view of the second embodiment example according to FIG. 7.

According to FIG. 8, the second latching elements 18.2' of the second end cap element 18 are designed in the form of latching hooks which have a nose-shaped or triangular cut-out. In particular, the second latching elements 18.2' are designed in one piece with the second end cap element 18. The lower part 14 is provided with a correspondingly designed second holding element 14.4' in the form of a triangular nose, for engagement with the second locking element 18.2'. Preferably, the first latching elements (not shown in FIG. 8) and the second latching elements 18.2' as well as the first receiving elements (not shown in FIG. 8) and the second receiving elements 14.4' are identical.

The temperature control device 10 according to the invention makes it possible to provide an integral design with improved temperature transfer. As the temperature control device 10 has a mechanical pretension in the assembled state, a continuous, two-sided surface pressure for coupling the first heating element or tempering element 20 is available. In addition, the underside 14.6 of the lower part 14 can be coupled to an external surface or a surface to be tempered.

As the lower part 14 serves as the central mounting for the other components of the temperature control unit 10, an integral, space-saving design is available. In addition, the earth contact element 26 has a bifunctional effect, namely as a ground connection and as a heat conductor element for the temperature sensor 28.

Based on this invention, a space-optimized temperature control device 10 is available that ensures efficient heat transfer even during a temperature increase.

LIST OR REFERENCE NUMERALS

10 Temperature control device
12 Upper part
12.1; 12.1' First interlocking element (of the upper part)
12.2; 12.2' Second interlocking element (of the upper part)
12.3 First clamping element
12.4 Second clamping element
12.5 Coupling surface (of the upper part)
14 Lower part
14.1; 14.1' First interlocking element (of the lower part)
14.2; 14.2' Second interlocking element (of the lower part)
14.3 First receiving element (of the lower part)
14.4; 14.4' Second receiving element (of the lower part)
14.5 Coupling surface (of the lower part)
14.6 Underside of the lower part
16 First end cap element
16a Upper part of the first end cap element
16b Lower part of the first end cap element
16.1 First latching element
16.2 Receiving element
16.3 Pin element
18 Second end cap element
18a Fastening clip
18b Base body
18c Nose element
18.2; 18.2' Second latching element
20 First tempering element/heating element
20a Upper side of the first tempering element
20b Underside of the first tempering element
24.1 First electrical connection
24.2 Second electrical connection
26 Earth contact element
28 Temperature sensor
32 Electrical cable/connecting cable

The invention claimed is:

1. A temperature control device for arrangement on a surface to be tempered, having at least one upper part, at least one lower part and at least one first tempering element
wherein the lower part and the upper part are configured as separate elements and configured to be connected to and detached from one another through elastic deformation of the upper part and/or lower part,
wherein the upper part is arranged opposite an upper side of the first tempering element and the lower part is arranged opposite lower side of the first tempering element,
wherein the lower part is configured for engagement with the upper part to provide a surface pressure with the upper part and the lower part in an orthogonal direction to the upper side and the lower side of the first tempering element for surface coupling of the lower part to the surface to be tempered, and
wherein the temperature control device is longitudinally displaceably attachable to the surface to be tempered in such a way that a change in length of the temperature control device in the longitudinal direction of the temperature control device can be accommodated.

2. The temperature control device according to claim 1, wherein the upper part has at least one first clamping element which extends in the longitudinal direction of the upper part, so that the upper part provides a pretension when it engages with the lower part.

3. The temperature control device according to claim 1, wherein the upper part has a surface structure.

4. The temperature control device according to claim 1, wherein the temperature control device has an earth contact element which can be connected to the underside of the first tempering element, so that a coupling to the first tempering element and the lower part can be provided.

5. The temperature control device according to claim 1, wherein first and second interlocking elements of mutually corresponding design are provided at side ends of the upper part and in side end regions of the lower part and extend in the longitudinal direction of the upper part and in the longitudinal direction of the lower part, so that the upper part and the lower part can be connected to one another in a force-locking and/or positive-locking manner.

6. The temperature control device according to claim 1, wherein the temperature control device has a first end cap element and a second end cap element, wherein the upper part, the first end cap element and the second end cap element are each arranged on the lower part.

7. The temperature control device according to claim 6, wherein the second end cap element has a base body and a fastening clip for fixing the base body to the surface to be tempered, wherein the fastening clip is arranged in a recess in the base body in such a way that a change in length of the upper part and/or the lower part can be compensated by means of elastic deformation of the fastening clip.

8. A system having a switch cabinet or an electronic housing, and a temperature control device according to claim 1.

9. The temperature control device according to claim 2, wherein the upper part provides the pretension when it engages with the lower part over an entire extension of the lower part.

10. The temperature control device according to claim 3, wherein the surface structure is a rib-shaped surface structure.

11. The temperature control device according to claim 1, wherein the at least one first tempering element is a resistance heating element.

12. The temperature control device according to claim 6, wherein the upper part and said lower part are disposed between the first and second end cap elements to form a housing for the first tempering element.

13. The temperature control device according to claim 6, wherein the first end cap element has at least one first latching element, the second end cap element has at least one second latching element and the lower part has at least one first receiving element and at least one second receiving element, wherein the first and second latching element are each formed corresponding to the first and second receiving element, for the force-locking and/or positive-locking connection of the lower part to the first and second end cap element.

14. The temperature control device according to claim 7, wherein at least one nose element is formed along the recess of the base body, for transmitting a clamping force between the base body and the fastening clip in the longitudinal direction of the temperature control device.

15. The temperature control device according to claim 4, wherein the coupling is an electrical-thermal coupling.

16. The temperature control device according to claim 15, wherein the temperature control device comprises a temperature sensor arranged on the earth contact element as a thermal conductor element.

* * * * *